Aug. 28, 1945. H. ZIEBOLZ 2,383,757
FORCE MEASURING APPARATUS
Filed May 23, 1942 3 Sheets-Sheet 1

Inventor
Herbert Ziebolz
A. D. Adams
Attorney

Aug. 28, 1945. H. ZIEBOLZ 2,383,757
FORCE MEASURING APPARATUS
Filed May 23, 1942 3 Sheets-Sheet 2

Inventor
Herbert Ziebolz
By A.D. Adams
Attorney

Aug. 28, 1945. H. ZIEBOLZ 2,383,757
FORCE MEASURING APPARATUS
Filed May 23, 1942 3 Sheets-Sheet 3
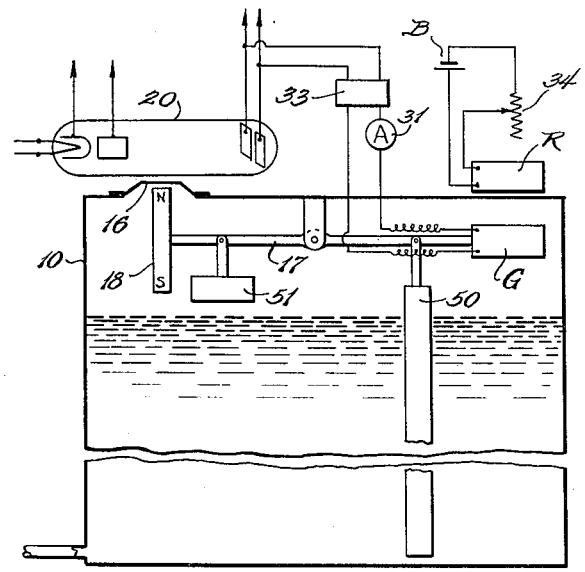
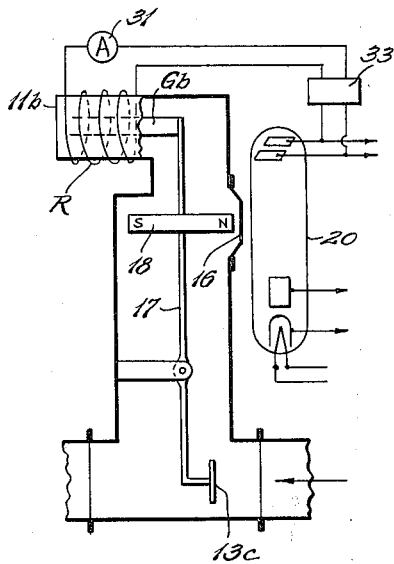
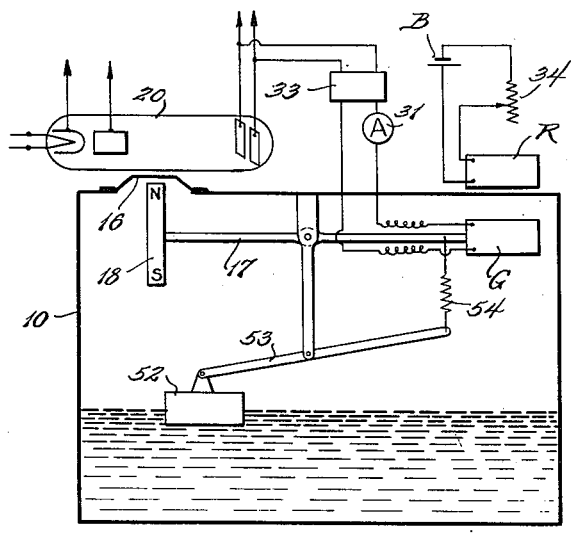
Inventor
Herbert Ziebolz
A. D. Adams
Attorney Patented Aug. 28, 1945

2,383,757

UNITED STATES PATENT OFFICE 2,383,757

FORCE MEASURING APPARATUS

Herbert Ziebolz, Chicago, Ill., assignor, by mesne assignments, to Electronbeam, Ltd., Chicago, Ill., a partnership of Illinois Application May 23, 1942, Serial No. 444,233

4 Claims. (Cl. 73—205)

This invention relates to apparatus for the measurement and indication of forces or pressures developed on the inside of a closed space. The invention may be employed to measure and indicate any other condition or factor which may be translated into force or pressure.

This invention is especially useful for the measurement and indication of the rate of flow of fluids, and while a number of embodiments of the flow measuring apparatus are illustrated and described herein, the invention is also useful for other purposes as will appear hereinafter.

Broadly, an object of the invention is to devise apparatus for the measurement and indication of forces or pressure developed on the inside of a pressure-tight casing or housing.

In prior flow measuring apparatus employing pressure sensitive diaphragms which respond to differential pressure developed across a measuring orifice, a troublesome problem has been the prevention of leakage of the fluid from the diaphragm housing through the stuffing box which surrounds the mechanical connection to the diaphragm. These stuffing boxes or packing glands are not only a source of difficulty due to the leakage of fluid, but they also impose a friction load on the diaphragm and prevent free movement of the diaphragm in response to the pressure differential.

An object of the present invention is to devise flow measuring apparatus employing a pressure sensitive diaphragm without using the usual stuffing box or packing gland.

A further object of the invention is to devise flow measuring apparatus in which all moving mechanical parts are entirely enclosed within a fluid-tight casing and in which movement of the pressure responsive diaphragm produces proportional controlling effects outside of the casing by electrical means.

A further object is to devise a flow measuring apparatus in which a pressure responsive diaphragm and a modified Kelvin balance are enclosed within a pressure-tight casing and the diaphragm serves to displace the lever or movable element of the balance in response to differential pressure developed on opposite sides of the diaphragm. Movement of the balance lever acts upon an electrical device outside of the casing to produce an electrical effect proportional to the movement of the lever, and the electrical effect is amplified and supplied to the balancing coils of the Kelvin balance located inside of the casing to thereby restore the balanced condition of the lever.

Still another object is to devise apparatus for indicating the level of a liquid in a pressure-tight casing by induction means operating from the inside of the casing.

A further object is to devise apparatus for indicating the extent of movement of a movable element located inside of a pressure-tight casing, the apparatus employing induction means located inside of the casing.

Various embodiments of the invention are illustrated in the accompanying drawings in which:

Figs. 4, 5 and 6 are diagrammatic showings of flow measuring apparatus using a modified current balance without any electric connections to the inside of the pressure-tight casing;

Fig. 7 is a diagrammatic representation of a liquid level indicating device wherein the force to be measured is developed by a buoyant body positioned in the liquid within a pressure-tight casing; and Fig. 8 shows diagrammatically another form of liquid level indicating device where the movement of a float located at the surface of the liquid is converted into a variable pressure which acts on the Kelvin balance located within the casing.

Figures 1, 1A:
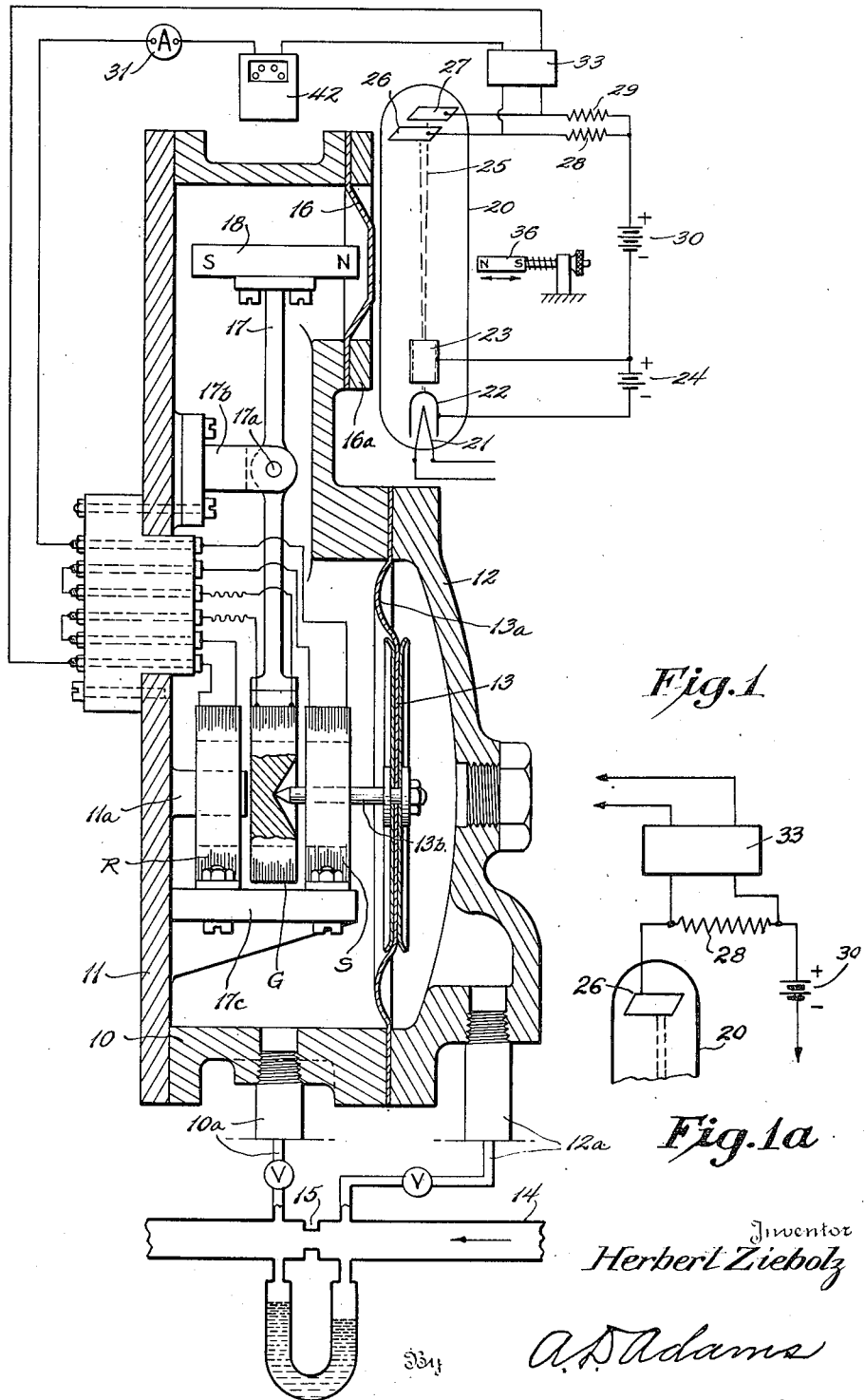
Fig. 1 shows the preferred construction of flow measuring apparatus employing a pressure responsive diaphragm and a modified Kelvin balance mounted within a pressure-tight casing, the casing and the diaphragm being shown in vertical section, while the Kelvin balance is shown in elevation.
Figure 1a is a fragmentary view showing the connections for a tube having only one anode.

Referring to Fig. 1 of the drawings, the pressure-tight casing or housing consists of a main casting 10 forming the side walls of the casing. A back cover plate 11 is secured to the casting 10 in fluid-tight relation. A plate 12 covers an opening in the front side of the casting 10 and serves to hold pressure diaphragm 13 in position within the casing, the diaphragm 13 being provided with a flexible peripheral portion 13a the outer edge of which is clamped between the plate 12 and the casing 10. It will thus be seen that diaphragm 13 divides the housing into two fluid-tight compartments, the space between the cover plate 12 and the diaphragm 13 comprising one compartment, and the space within the casing 10 on the opposite side of the diaphragm 13 comprising the other compartment. The front compartment is connected by a connection 12a to a fluid conduit 14 on the high pressure side of a metering orifice 15, while the other compartment is connected by a connection 10a to the lower pressure side of orifice 15 in conduit 14. Suitable cut-off valves may be included in the connections 10a and 12a as shown.

A non-magnetic diaphragm 16 of high tensile strength is clamped over an opening formed in the front face of casing 10 near the top thereof and is maintained in position by a suitable clamping ring 16a secured to the casing 10.

The modified Kelvin balance mounted within the casing 10 comprises a beam or lever 17 pivotally supported at 17a on a fixed support 17b mounted within the casing. The lower end of the lever or beam 17 carries a coil or a winding G, and two fixed coils R and S are mounted on opposite sides of the coil G and supported from a suitable fixed support 17c carried on the back plate 11. A rod or finger 13b secured to the diaphragm 13 at the center thereof extends inwardly through coil S and bears against the support for coil G carried by the lever 17 and operates to displace the lever 17 in accordance with movements of the diaphragm 13. A fixed stop 11a carried by plate 11 extends into coil R and serves to limit the displacement of the coil G and lever 17.

The upper end of the lever 17 carries an electric induction element which is capable of inducing a controlling effect on the outside of the casing through the non-magnetic wall section formed by the diaphragm 16. This induction element may be of a type for producing or influencing a controlling field outside of the casing, the controlling field being capable of influencing an electron beam or stream. In the example illustrated in the drawings, the induction element is formed of a permanent magnet 18 for producing a magnetic field on the outside of the non-magnetic section of the casing wall. It will be understood that any other form of magnetic field producing means may be employed.

Movement of the induction member 18 causes corresponding movements of the magnetic field or controlling effects of the induction member on the outside of the diaphragm 16, and a suitable electric relay is positioned in front of the diaphragm 16 to be controlled by the controlling effects of the induction member 18. It will be obvious to those skilled in the art that different types of electric relays may be employed. One suitable relay has been illustrated which corresponds to the relay shown in my copending application Ser. No. 434,281, filed March 11, 1942.

The relay consists of a cathode ray tube having an insulating envelope 20. The internal construction of the cathode ray tube may be of any suitable and well known type, but for the purpose of illustration, the tube has a source of electrons represented by a heater or filament 21 for heating an electron emitting cathode 22. The electrons emitted by cathode 22 are accelerated and focused into an electron beam of suitable shape directed along the axis of the tube by means of an accelerating and concentrating electrode 23 mounted in the tube and maintained at positive potential with respect to the cathode 22 by means of a suitable source of potential represented by the battery 24. The electron beam established within the tube is indicated by dotted line 25.

Suitable electron receiving means, represented by the anode plates 26 and 27, are positioned within the tube to receive electrons from the beam 25. While two anode plates have been shown, it will be understood that only one plate may be employed if desired (see Figure 1a). The anodes 26 and 27 are connected through suitable coupling resistances 28 and 29 to a source of positive potential, represented by the battery 30, the negative terminal of which is connected to the positive terminal of battery 24. In some instances, the battery 30 may be omitted. Moreover, it is not essential that resistances 28 and 29 be connected to the battery 24, but they may be connected to ground.

The relay 20 controls the amount of current supplied to current coils G, R and S connected in series in a circuit which includes an ammeter 31. The energizing current may be supplied directly from the anodes 26 and 27 of the relay, or a suitable amplifier 33 may be interposed in the supply circuit. It will be understood that coils G, R and S are connected in a direction such that the force exerted on the coil G is in opposition to the force exerted on this coil by the diaphragm 13.

The magnetic field from magnet 18 tends to deflect the electron beam 25 from its neutral position. In order to prevent deflection of the electron beam when lever 17 is in its balanced position, it is desirable to provide a second magnet 36 mounted on the opposite side of the electron relay in a position to act upon the electron beam with a force equal and opposite to the force established by magnet 18. The magnet 36 is mounted for adjustment with respect to the relay by suitable mounting means represented in the drawings.

Operation of the arrangement shown in Fig. 1 is as follows: With no force applied to lever 17 from diaphragm 13, the apparatus is adjusted so that the electron beam 25 is in its neutral position and no current is flowing in windings G, R and S. Proper adjustment may be obtained by adjusting the position of the magnet 36. As soon as a force is applied to lever 17 by diaphragm 13 due to a pressure differential developed on opposite sides of orifice or restriction 15, magnet 18 moves closer to the electronic relay and deflects the beam 25 so that the anode 27 receives electrons (or receives more electrons than anode 26), and establishes a potential difference between anodes 26 and 27, thereby establishing current flow in windings G, R and S. The force on coil G tends to move the lower end of the lever to the right and thereby tends to counterbalance the force exerted by diaphragm 13 and tends to restore the lever 17 to its balanced position.

The electronic relay is designed so that a very slight movement of magnet 18 is sufficient to produce a maximum potential difference between anodes 26 and 27, in other words, a very slight movement of magnet 18 is sufficient to produce maximum counterbalancing force on lever 17. Under this condition, lever 17 will move only a slight distance from its normally balanced position to establish sufficient current in windings G, R and S to counterbalance the force exerted by diaphragm 13.

The differential pressure developed on the diaphragm 13 and applied to the lever 17 varies as the square of the rate of flow of the fluid in conduit 14. Thus, F (force on 17) $= k \cdot Q^2$, where $k$ is a constant and Q is the rate of flow. Since the counterbalancing force developed by coils R, G and S is proportional to the square of the current in these coils, the square of the rate of flow ($Q^2$) will be proportional to the square of the current flowing through meter 31. In other words, the current flowing through meter 31 will be directly proportional to the rate of flow Q. Accordingly, the meter 31 may be graduated to indicate directly the rate of flow of the fluid in conduit 14. If desired, an electric meter of the amperehourmeter type may be connected in the circuit of meter 31 as indicated at 42, and this meter will serve to register the total quantity of fluid flowing past the aperture 15 in a given time.

Figure 2:
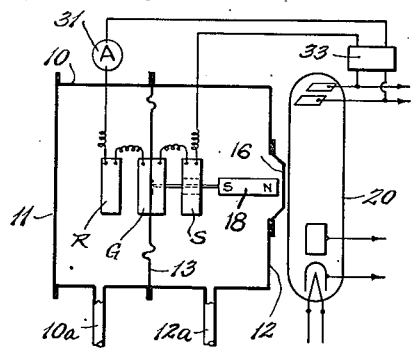
Fig. 2 shows a modified flow measuring apparatus in which the balance lever has been omitted and the movable coil of the current balance is mounted on the pressure responsive diaphragm.

In Fig. 2, I have shown a modified form of flow-measuring apparatus in which the balance lever 17 has been omitted, and the coil G and the induction element 18 are mounted upon and are movable with the pressure responsive diaphragm 13. Balance coil R is located on one side of the diaphragm while the coil S is mounted on the opposite side, all three coils being connected in series as in Fig. 1. The electrical connections for the coils and the relay are the same as in Fig. 1. The operation of Fig. 2 will be clear from the foregoing description of operation of Fig. 1. Coils R and S in Fig. 2 are stationary coils.

Figure 3:
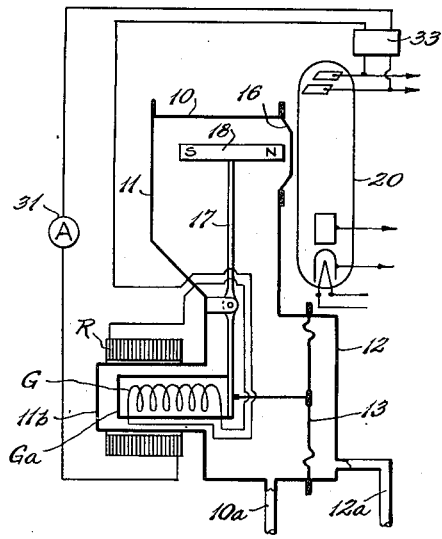
Fig. 3 is a modified form of flow-measuring apparatus wherein the stationary coil of the Kelvin balance is located outside of the casing.

Another form of flow measuring apparatus is shown in Fig. 3 where the two stationary coils of the current balance are combined into one coil R located on the outside of the pressure-tight casing and arranged to surround a non-magnetic hollow cylinder 11b supported on back-plate 11 and opening into the pressure-tight casing. The movable coil G of the current balance carried by the lower end of the lever 17 is positioned within cylinder 11b and may also be provided with a protective housing Ga formed of glass or other non-corrosive material. In other respects the construction shown in Fig. 3 is the same as that shown in Fig. 1. Coils R and G are connected in series with each other and supplied from the amplifier 33 as in Fig. 1, and the inter-action of the two magnetic fields established by these coils acts in the same manner as in Fig. 1 to establish a counterbalancing force on the diaphragm 13. The leads to coil G are provided with non-corrosive, insulating coverings, which permits the arrangement to be used for measuring the flow of corrosive liquids or gases.

Figure 4:
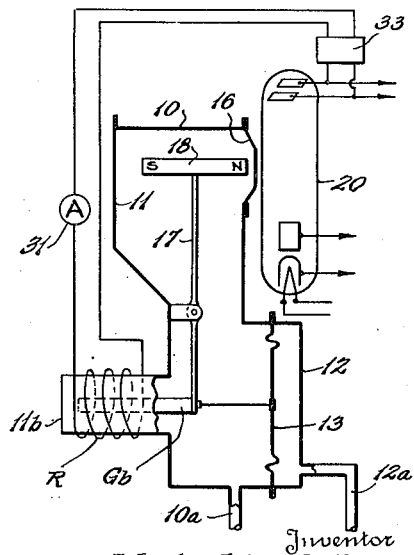

The arrangement shown in Fig. 4 is substantially like that shown in Fig. 3 except that instead of employing a movable coil G on the balance lever 17, a magnetic core Gb is arranged within the non-magnetic cylinder 11b in inductive relation to the coil R and is carried by the lever 17 and connected to the diaphragm 13 as shown. The action of the coil R upon the core Gb establishes the necessary counterbalancing force on the diaphragm 13.

Figure 5:
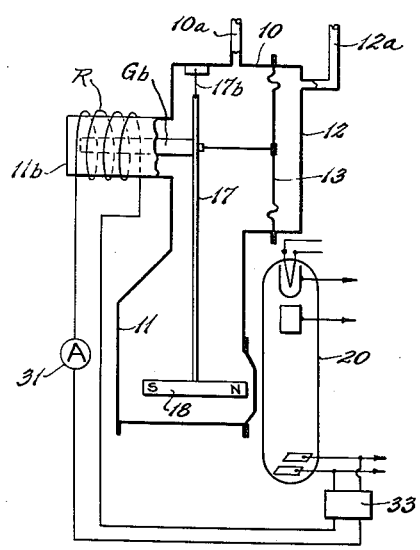

The arrangement shown in Fig. 5 is substantially like that shown in Fig. 4 except for the manner of supporting the balance lever 17. In this arrangement, the lever, instead of being pivotally supported at a point intermediate its ends, is suspended vertically by a short leaf spring 17b secured to the casing. The restoring force of the spring should be small, compared with the force acting on the lever 17. Except for the change in positions of the other elements, the arrangement shown in Fig. 5 corresponds to that shown in Fig. 4, and the operation is believed to be clear.

The flow measuring apparatus shown in Fig. 6 is a modified arrangement of that shown in Fig. 4. Instead of employing a diaphragm 13 dividing the casing into two fluid-tight compartments, a plate or vane 13c is positioned in the path of travel of the fluid which enters the casing on the right and leaves the casing on the left, the vane 13c being carried by the lower end of balance lever 17. In this arrangement the induction core Gb is located at the upper end of the lever 17 and cooperates with the coil R in the same manner as in Figs. 4 and 5. Otherwise, the arrangement is the same as in Fig. 4. It will be understood that the flow of fluid past plate 13c exerts a definite pressure on the plate and thereby unbalances the lever 17 in a manner similar to the section of the diaphragm 13 upon beam in Fig. 1.

In Fig. 7 the fluid-tight casing 10 assumes the form of a storage tank in which liquid is stored and it is desired to measure and indicate the level of the liquid. In this arrangement, parts of the Kelvin balance are located within the casing as shown, the parts being identified by the same reference numerals employed in Fig. 1. The induction element 18 is positioned to move adjacent the non-magnetic diaphragm 16 and influences the relay 20. The movable balance coil G carried by the lever 17 is arranged to cooperate with the fixed coil R located on the outside of the casing. One of these coils is energized by current from amplifier 33; while the other is preferably supplied with a constant current from a suitable source, represented by battery B. The value of the constant current may be adjusted by variable resistance 34. The unbalancing force is applied to lever 17 by means of a relatively long buoyant member 50 which is attached to the lever and extends vertically downward to a point near the bottom of the casing. A suitable counterweight 51 is also attached to the lever and serves to normally counterbalance the weight of the member 50 and other parts of the balance when the casing contains no liquid. The relay connections for Fig. 7 are the same as in Fig. 1.

As the liquid level in tank 10 rises, the buoyant effect upon member 50 increases in direct proportion to the height of the liquid level above the bottom of the tank. This buoyant force tends to unbalance lever 17 and thereby acts upon relay 20 to apply a counterbalancing force through the action of coils R and G, and the meter 31 will provide an indication of the liquid level.

The second arrangement for indicating liquid level is shown in Fig. 8, and this arrangement illustrates how my invention may be employed to convert a variable movement into a variable force and for indicating the magnitude of the movement on the outside of a pressure-tight casing. The arrangement in Fig. 8 differs from Fig. 7 in that it employs a surface float 52 which moves up and down with the change in level of the liquid within the tank 10. In Fig. 7, the buoyant body 50 remains substantially stationary, while in Fig. 8 the float 52 follows the level of the liquid. The movement of the float 52 is converted into a variable force acting upon the lever 17 by means of a pivoted lever 53 having one end attached to the float 52 and the other end attached to lever 17 through an extensible spring 54. The electric connections for the arrangement shown in Fig. 8 are the same as in Fig. 7. As the float 52 rises, the spring 54 becomes extended and applies a greater force to the lever 17 and thereby unbalances the lever and causes relay 20 to supply an increased current to coils R and G to reestablish the balance of the lever. Preferably, float 52 is sufficiently large so that the force which it must exert on the balance does not appreciably change its liquid displacement. It will be obvious that the arrangement shown in Fig. 8 may be employed for measuring or indicating the extent of movement of any other body or object acting on lever 17 through spring 54.

The flow measuring apparatus disclosed herein is useful for measuring the rate of flow, or the quantity of flow of gases or liquids. No special insulating problem is involved for coils G, R and S in the case of gases or insulating liquids, but in the case of conducting liquids, these coils and their connections may be impregnated or covered with suitable insulating coatings. The electrical connections to coils G, R and S are brought out from the casing through fluid-tight seals which are easily constructed and do not present the same problem as that of forming a fluid-tight seal around a mechanical element which must move relative to the casing. The present invention therefore avoids the usual difficulties found in maintaining a proper seal in a stuffing box and avoids inaccuracies due to mechanical friction.

In the appended claims, the term "induction element" is employed broadly to indicate any element which induces a controlling effect outside of the casing, the effect being capable of influencing an electron stream. Also, the term "magnet" is used in a broad sense to apply either to an electromagnet or a permanent magnet.

What is claimed is:

1. In flow-measuring apparatus, the combination of a fluid-tight casing, a pressure sensitive diaphragm mounted in said casing and dividing the casing into two fluid-tight compartments, fluid connections to each of said compartments for subjecting opposite sides of said diaphragm to a pressure differential, a magnet positioned within one of said compartments and being mounted for movement adjacent a section of the wall of said casing and producing a variable magnetic field outside of said casing, a connection between said magnet and said diaphragm for moving said magnet in accordance with movement of said diaphragm, and a cathode ray tube positioned on the outside of said wall section in a position to have the electron beam thereof deflected by said variable magnetic field.

2. Flow measuring apparatus according to claim 1 wherein a second magnet is mounted within said fluid-tight casing and is connected for movement with said diaphragm, a magnetic coil mounted on the outside of said casing in a position to establish a magnetic field within said casing to react with the field of said second magnet, and means for energizing said magnetic coil from said cathode ray tube in a direction tending to oppose the movement of said diaphragm.

3. Measuring apparatus comprising a fluid-tight casing, a movable member within the casing subjected to a force to be measured, a magnet located within said casing and being operated by said movable member and producing a variable magnetic field outside of said casing, a cathode ray tube located outside of said casing in a position to have the beam thereof deflected by said variable magnetic field, a second magnet mounted within said casing and being movable with said movable member, a magnetic winding located outside of said casing and arranged to establish a magnetic field within said casing to react with said second magnet, and means for energizing said magnetic winding from said cathode ray tube in a direction to oppose the movement of said movable member.

4. Measuring apparatus comprising a fluid-tight casing, a movable member within the casing subjected to a force to be measured, a magnet located within said casing and being operated by said movable member and producing a variable magnetic field outside of said casing, a cathode ray tube located outside of said casing in a position to have the electron beam thereof deflected by said variable magnetic field, an output circuit for said cathode ray tube, and means energized from said output circuit for applying a force to said movable member in opposition to the force being measured and of a magnitude which increases with increasing movement of said movable member, whereby a predetermined movement of said movable member establishes a balanced condition of the forces acting on said member.

HERBERT ZIEBOLZ.